(12) United States Patent
Chu

(10) Patent No.: US 7,313,115 B2
(45) Date of Patent: Dec. 25, 2007

(54) TFO-CAPABLE COMMUNICATION APPARATUS

(75) Inventor: Chung Cheung C. Chu, Brossard (CA)

(73) Assignee: Nortel Networks Limited, St-Laurent, Quebec (CA)

( * ) Notice: Subject to any disclaimer, the term of this patent is extended or adjusted under 35 U.S.C. 154(b) by 999 days.

(21) Appl. No.: 10/403,109

(22) Filed: Apr. 1, 2003

(65) Prior Publication Data

US 2003/0236909 A1    Dec. 25, 2003

Related U.S. Application Data

(60) Provisional application No. 60/370,688, filed on Apr. 9, 2002.

(30) Foreign Application Priority Data

Apr. 23, 2002 (DE) .............................. 102 18 037

(51) Int. Cl.
*H04B 7/216* (2006.01)

(52) U.S. Cl. .................. 370/335; 370/352; 370/503; 370/208; 709/232; 709/230; 455/450; 455/509; 455/426.1

(58) Field of Classification Search .......... 370/503, 370/352; 709/232, 230; 704/201; 455/464
See application file for complete search history.

(56) References Cited

U.S. PATENT DOCUMENTS

| | | | | |
|---|---|---|---|---|
| 5,204,900 | A * | 4/1993 | Pires | 380/233 |
| 5,519,504 | A * | 5/1996 | Keesen | 386/116 |
| 6,208,869 | B1 * | 3/2001 | Roberts et al. | 455/465 |
| 6,349,204 | B1 * | 2/2002 | Goetz et al. | 455/419 |
| 6,452,941 | B1 * | 9/2002 | Bruhn | 370/468 |
| 6,477,502 | B1 * | 11/2002 | Ananthpadmanabhan et al. | 704/503 |
| 6,697,642 | B1 * | 2/2004 | Thomas | 455/562.1 |
| 6,721,569 | B1 * | 4/2004 | Hashem et al. | 455/450 |
| 7,151,925 | B2 * | 12/2006 | Ting et al. | 455/418 |
| 7,190,953 | B2 * | 3/2007 | Richter | 455/419 |

(Continued)

FOREIGN PATENT DOCUMENTS

EP    0 825 791 A1    2/1998

OTHER PUBLICATIONS

3GPP TS 28.062 V4.2.0 (Dec. 2001) 3rd Generation Partnership Project; Technical Specification Group Services and System Aspects; Inband Tandem Free Operation (TFO) of speech codecs; Service description; Stage 3 (Release 4).

(Continued)

*Primary Examiner*—Marceau Milord

(57) ABSTRACT

Apparatus communicating with a mobile and a remote base station. The mobile is assumed to have a coding unit capable of operating in at least one mode selected from a set, each mode in the set being associated with a coding requirement. The set is characterized in that it has at least one mode that is associated with a greater coding requirement than a "designated" mode. Also, the apparatus comprises a control entity suitable to establish a tandem-free transfer of data received from the mobile to the remote base station. The control entity is operative to send control information to the mobile to cause the coding unit therein to operate in the designated mode prior to establishment of the tandem-free transfer. By forcing the mobile to operate in the designated mode, it is guaranteed that the tandem-free transfer can be achieved.

28 Claims, 2 Drawing Sheets

U.S. PATENT DOCUMENTS

2001/0006895 A1 7/2001 Della Mea
2001/0024960 A1 9/2001 Mauger

OTHER PUBLICATIONS

3GPP TS 28.062 V4.3.0 (Mar. 2002) 3rd Generation Partnership Project; Technical Specification Group Services and System Aspects; Inband Tandem Free Operation (TFO) of speech codecs; Service description; Stage 3 (Release 4).

3GPP TS 45.009 V4.2.0 (Nov. 2001) 3rd Generation Partnership Project; Technical Specification Group GSM/EDGE Radio Access Network; Link adaptation (Release 4).

ETSI TS 128 062 V4.2.0: "Inband Tandem Free Operation (TFO) of Speech Codecs; Service Description Stage 3 (3GPP TS 28.062 version 4.2.0 Release 4)"; Digital Cellular Telecommunications System (Phase 2+) (GSM); Universal Mobile Telecommunications System (UMTS); URL:http://www.esti.org; Dec. 2001.

European Search Report PCT/CA03/00460; Jun. 16, 2003.

* cited by examiner

TFO-CAPABLE COMMUNICATION APPARATUS

CROSS-REFERENCES TO RELATED APPLICATIONS

The present invention claims the benefit under 35 USC §119(e) of prior U.S. provisional patent application Ser. No. 60/370,688 to Chu, filed Apr. 9, 2002, incorporated by reference herein.

FIELD OF THE INVENTION

The present invention relates generally to communication devices and, more particularly, to communication devices using multiple coding rates and capable of tandem-free operation.

BACKGROUND OF THE INVENTION

Tandem-free operation (TFO) is a protocol that negotiates the removal of speech encoding and decoding functions within two entities engaged in a communication connection, if the encoder and the decoder types match. TFO can be applied, for example, in a core network supporting a mobile-to-mobile connection, resulting in a direct logical connection between the speech encoding and decoding functions of the mobiles. For more information on TFO protocols, the reader is invited to refer to the following documents, the contents of which are hereby incorporated by reference herein:

$3^{rd}$ generation partnership project, Technical specification group services and system aspects, Inband tandem free operation (TFO) of speech codecs, service description—Stage 3 (3GPP TS 28.062 V4.3.0 (2002-09));

$3^{rd}$ Generation Partnership Project; Technical Specification Group, GSM/EDGE Radio Access Network; (3GPP-TS 45.009 V4.2.0) Link adaptation CDMA TFO standard TIA/EIA-895, "CDMA Tandem Free Operation"

CDMA TFO standard TIA/EIA/IS-893 "Selectable Mode Variable Service Option for Wideband Spread Spectrum Communication"

TFO can be used in the context of CDMA communication, in particular with a Selectable Mode Vocoder (SMV) codec. An SMV codec has several modes of operation. The normal modes are mode 0 (premium), mode 1 (standard), mode 2 (economy) and mode 3 (capacity-saving). In these modes all coding/decoding rates (full rate, ½ rate, ¼ rate and ⅛ rate) are used. However, there also exist mode 4 and mode 5, which use ½ rate, ¼ rate and ⅛ rate only, i.e., the full rate is not used. Proposed CDMA TFO negotiation protocols do not provide for codec capability exchange prior to entering TFO operation. Accordingly, a possibility exists that one entity that happens to be operating in mode 4 or 5 engages into TFO communication with another entity that is operating in mode 0, 1, 2 or 3. In this case, the entity operating in mode 4 or 5 is not capable of accepting full-rate data from the distant partner. This may lead to premature TFO establishment, unnecessary TFO termination and TFO failures.

Accordingly, a need exists in the industry to provide communication devices that support TFO operation and that are protected against TFO engagement when the two sides of the connection operate in incompatible modes.

SUMMARY OF THE INVENTION

In accordance with a first broad aspect, the invention seeks to provide a communication apparatus having a first interface for establishing a first communication link with a first remote entity, the first remote entity including a coding unit capable of operating in at least one mode selected from a set of modes, wherein each mode in the set of modes is associated with a respective coding requirement. The communication apparatus also comprises a second interface for establishing a second communication link with a second remote entity. Also, the communication apparatus comprises a control entity suitable to establish a tandem-free transfer of data exchanged between the first remote entity and the second remote entity via said first and second interfaces. The control entity is operative to send control information to the first remote entity via said first interface to cause the coding unit to operate in a designated mode in the set of modes prior to establishment of the tandem-free transfer of data. The set of modes is characterized in that it has at least one mode that is associated with a greater coding requirement than the designated mode.

As used herein, the term "designated", in the context of the mode of operation of the first remote entity, is intended to refer to a mode of operation that can be selected by the communication apparatus without involving the second remote entity. That is to say, a "designated" mode is a mode that can be determined by the communication apparatus entity without requiring knowledge of the operational capabilities of the second remote entity. This is in contrast to a mode that can only be determined through an exchange of mode capability information between the communication apparatus and the second remote entity.

As used herein, the term "coding unit" refers to any or all of a voice codec, an encoder and/or a decoder. Such may be implemented using, inter alia, hardware, software, control logic, programmable logic gates or any combination thereof.

As used herein, the term "coding requirement", in the context of describing a property of a mode of operation of a coding unit, is intended to refer to a property associated with any or all of the maximum coding rate associated with said mode, the number of coding rates in said mode, the average coding rate in said mode, or any combination thereof.

In accordance with another embodiment, the present invention seeks to provide a communication method, comprising establishing a first communication link with a first remote entity, the first remote entity including a coding unit capable of operating in at least one mode selected from a set of modes, wherein each mode in the set of modes is associated with a coding requirement. The method further comprises establishing a second communication link with a second remote entity. Also, the method comprises sending control information to the first remote entity via the first interface to cause the coding unit to operate in a designated mode in the set of modes. The method further comprises establishing a tandem-free transfer of data received at the first interface from the first remote entity to the second remote entity via the second interface. The set of modes is characterized in that it has at least one mode that is associated with a greater coding requirement than the designated mode.

In accordance with a third broad aspect, the present invention comprises a computer-readable storage medium containing a program element for execution by a computer to implement a communication control entity. The communication control entity comprises a first interface for establishing a first communication link with a first remote entity, the first remote entity including a coding unit capable of operating in at least one mode selected from a set of modes, wherein each mode in the set of modes is associated with a respective coding requirement. The communication control entity also comprises a second interface for establishing a second communication link with a second remote entity, as well as a control entity suitable to establish a tandem-free transfer of data received at said first interface from the first remote entity to the second remote entity via said second interface, said control entity being operative to send control information to the first remote entity via said first interface to cause the coding unit to operate in a designated mode in the set of modes prior to establishment of the tandem-free transfer of data. The set of modes is characterized in that it has at least one mode that is associated with a greater coding requirement than the designated mode.

The present invention may also be broadly summarized as a signal embodied in a transmission medium, where the signal originates from a communication apparatus and is destined for a first remote entity having a coding unit capable of operating in at least one mode selected from a set of modes, wherein each mode in the set of modes is associated with a respective coding requirement. The signal comprises information capable of causing the coding unit to operate in a designated mode in the set of modes prior to establishment of a tandem-free transfer of data received by the apparatus from the first remote entity to a second remote entity, wherein the set of modes is characterized in that it has at least one mode that is associated with a greater coding requirement than the designated mode.

The present invention facilitates a faster TFO engagement and establishment. In addition, the risk of TFO engagement when the two sides of the connection operate under incompatible modes is significantly reduced.

BRIEF DESCRIPTION OF THE DRAWINGS

A detailed description of examples of implementation of the present invention is provided hereinbelow with reference to the following drawings, in which.

Figure 1:
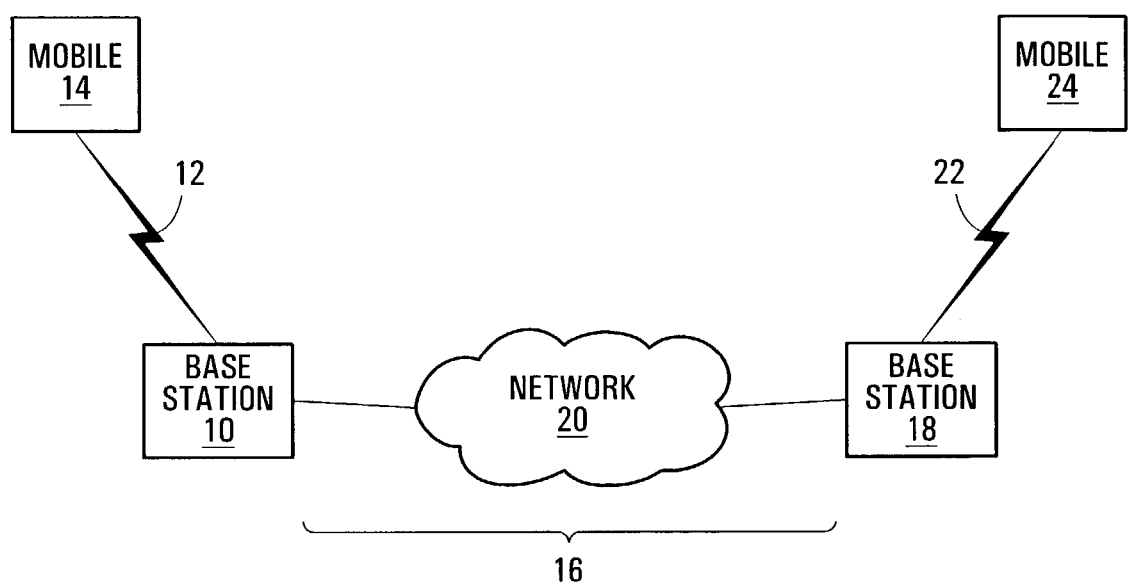
FIG. 1 is a block diagram of network components involved in a mobile-to-mobile call.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION

FIG. 1 illustrates a block diagram of the network components involved in a mobile-to-mobile audio call. The network components include a base station 10 that establishes a wireless communication link 12 with a mobile 14, the communication link 12 being effected over an air interface. The base station 10 also establishes a communication link 16 with a remote base station 18. The communication link 16 can be made through a network 20, such as the PSTN, via a direct electrical or optical cable connection, or an air interface. Finally, the remote base station 18 establishes a wireless communication link 22 with a remote mobile 24 over an air interface.

Figure 2:
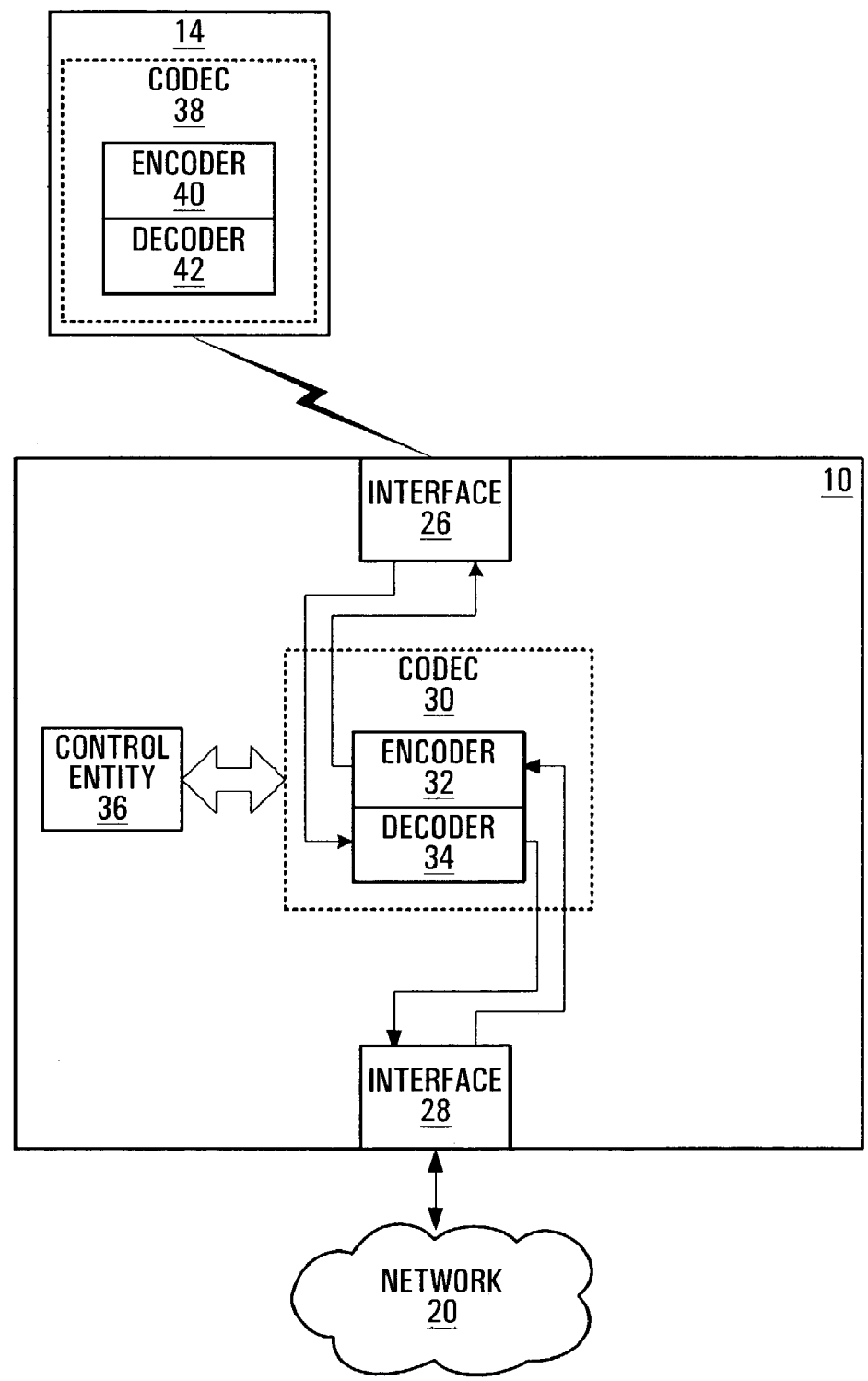
FIG. 2 is a more detailed block diagram of a base station and of one of the mobiles involved in the mobile-to-mobile call.

FIG. 2 is a more detailed block diagram of the base station 10 and the mobile 14. The block diagram of the remote base station 18 and the remote mobile 24 is identical and for this reason it is not shown. The base station 10 includes an interface 26 through which the wireless communication link 12 with the mobile 14 is established. The wireless communication link 12 may be a CDMA communication link, for example. In addition, the communication between the base station 10 and the remote base station 18 is established via an interface 28.

The base station 10 comprises an audio codec 30 in communication with the interfaces 26 and 28. The codec 30 includes an encoder 32 and a decoder 34. The decoder 34 processes audio data flowing from the mobile 14 towards the remote base station 18, while the encoder 32 processes audio data flowing from the remote base station 18 towards the mobile 14. A control entity 36 in the base station 10 controls the operation of the codec 30, as will be described later on in greater detail.

The mobile 14 also has a codec 38 including an encoder 40 and a decoder 42. The encoder 40 processes audio data flowing from a user (e.g., via a microphone) towards the base station 10, while the decoder 42 processes encoded audio data flowing from the base station 10 towards the user (e.g., via a speaker).

In the case of CDMA communications, the codecs 30, 38 may be selectable mode vocoder (SMV) codecs. Other suitable codecs that can be used without departing from the spirit of this invention include, but are not limited to EVRC, Q8 and Q13 multi-rate speech codecs.

The codecs 30 and 38 are characterized in that they can operate in a plurality of modes. The set of modes under which any one of the codecs 30 and 38 can operate are such that at least one mode exists that is associated with a greater coding requirement (e.g., by virtue of supporting a larger number of coding rates) than another mode in the set. A non-limiting example will illustrate this point. In the case of an SMV codec, the supported modes are mode 0 (premium), mode 1 (standard), mode 2 (economy) and mode 3 (capacity-saving). Under any one of those modes the SMV codec can handle all coding rates, such as full rate, ½ rate, ¼ rate and ⅛ rate. There are also modes 4 and 5 that support only ½ rate, ¼ rate and ⅛ rate. Specifically, mode 4 corresponds to mode 0 without the full rate and mode 5 corresponds to mode 1 without the full rate. Thus, it will be apparent that modes 4 and 5 do not support the full rate.

The control entity 36, which may be implemented in software, hardware or a combination of software and hardware, has the ability to control the mode of operation of the codec 30 in the base station 10 and the codec 38 in the mobile 14. Depending on the circumstances (e.g., under different bandwidth or capacity constraints), the base station 10 might not allow all of the mobiles it serves to operate in a codec mode that offers the maximum quality. That is to say, the control entity 36 may instruct different mobiles (such as mobile 14) to operate in different modes (even though they are capable of better performance) so as to balance issues of capacity, bandwidth and quality of service guarantees.

Thus, it is envisaged that calls established with various mobiles served by the same base station 10 may involve the codecs in those various mobiles operating in different modes. Moreover, the base station 10 can be assumed to have knowledge of the set of modes in which each of the mobiles it serves could operate (in addition to the mode it is currently operating in) while satisfying the constraints of the base station 10. It should be noted that in the case of SMV codecs, such codecs are generally capable of operating in modes 0, 1, 2, 3, 4 and 5, although the base station 10 knows only that, at the very least, modes 4 and 5 are always supportable. Whether modes 0, 1, 2 or 3 are supportable depends on conditions of capacity, bandwidth and quality of service, among others.

In the case of a mobile-to-mobile call (as shown in FIG. 1), a direct logical connection between the speech encoding and decoding functions of the mobiles may be possible. This is known as tandem-free operation (TFO). Accordingly, the control entity 36 is designed to negotiate with the control entity of the remote base station 18 an eventual TFO transfer of data, during which audio data encoded at the mobile 14 is passed to the base station 18 without decoding by the decoder 34. Similarly, under TFO, audio data received from the remote base station 18 in encoded format is passed to the mobile 14 without encoding by the encoder 32.

With the aim of entering into TFO operation, the control entity 36 negotiates with the control entity of the remote base station 18 by exchanging signals over the communication link 16. In one embodiment, these signals are in accordance with TFO standards and, as such, do not allow for the exchange of information regarding the precise mode in which the remote mobile 24 is currently operating or the set of modes in which the remote base station 18 will allow the remote mobile 24 to operate while satisfying base station constraints. However, the control entity 36 must still find a way to establish TFO operation.

To this end, and first considering the direction from the mobile 14 towards the remote mobile 24, the control entity 36 sends control information to the mobile 14 via the interface 26 and the wireless communication link 12. This control information causes the encoder 40 in the mobile 14 to operate in a "designated mode" that is guaranteed to be compatible with both sides of the call, without knowledge of the precise mode in which the remote mobile 24 is currently operating or the set of modes in which the remote base station 18 will allow the remote mobile 24 to operate while satisfying base station constraints. Generally speaking, a designated mode is a mode in a set of modes other than a mode supporting all possible coding rates. In the case of SMV codecs, a suitable designated mode that is guaranteed to be compatible with both sides is mode 4 or mode 5. It should thus be appreciated that the "designated mode" of operation of the mobile 14 is selected by the control entity 36 without involving the remote base station 18 or the remote mobile 24.

As a consequence of the foregoing, immediately prior to TFO operation, audio data directed from the mobile 14 toward the mobile 24 is encoded at the encoder 40 in the designated mode of operation, decoded by the decoder 34 then passed to the base station 18 through the interface 28. Once TFO operation is engaged by the control entity 36, the audio data received from the mobile 14 no longer needs to be decoded and can bypass the decoder 34. Alternatively, it is possible to allow the decoder 34 in the codec 30 to continue to operate. What is sent to base station 18 in this case is coded audio data together with all or part of its decoded version, which can be sent for reasons related to law enforcement or safety (e.g., emergency 911) and is normally dropped by base station 18.

Meanwhile, in the opposite direction (i.e., from the remote base station 18 towards the mobile 14), the control entity 36 sends control information to the mobile 14 to force the decoder 42 to operate in a designated mode other than a mode supporting all the possible data rates. For an SMV codec, this designated mode may be mode 4 or mode 5. However, it should be expressly noted that the decoder 42 could operate in a different mode than the encoder 40, i.e., the second designated mode may or may not be the same designated mode as that is being used in the direction from the mobile 14 to the remote base station 18. However, as a practical matter, both the encoder and the decoder of the same codec are usually instructed to operate in the same mode.

As a consequence of the foregoing, immediately prior to TFO operation, decoded audio data is received from the base station 18 via the interface 28. The received data is encoded by the encoder 32 and is passed via the interface 26 to the mobile 14, where it is decoded by the decoder 42. Once TFO operation is engaged by the control entity 36, the audio data received from the base station 18 is already in encoded format and thus the encoder 32 can be bypassed (i.e., disabled).

Subsequent to engagement of TFO operation, the control entity 36 can be adapted to exchange with the control entity of the base station 18 information about the mode capability of each side. Specifically, the base stations 10 and 18 may be adapted to exchange the identities of the modes in which the respective mobiles 14 and 24 are currently operating or the sets of modes in which the respective base stations 10 and 18 will allow the respective mobiles 14 and 24 to operate while satisfying base station constraints. This control information exchange can be achieved by in-band signalling but could also be done in other ways, without departing from the spirit of the invention.

For example, if the control entity 36 realizes that the other side and itself can support a mode higher than mode 4 or mode 5, say mode X (where X=0, 1, 2 or 3), then the control entity 36 sends control information to the mobile 14 over the wireless communication link 12 to allow the encoder 40 and the decoder 42 to operate in mode X. The same operation occurs at the other side involving the base station 18 and the mobile 24, resulting in the codecs in both the mobiles 14 and 24 operating in mode X that supports a larger number of coding rates than the designated mode.

Although the above description has mainly dealt with the case where the set of modes in which the mobile 14 is capable of operating includes at least one mode that supports a greater number of coding rates than the designated mode, it should be appreciated that the designated mode may be selected a priori on a different basis. Generally speaking, it is desirable to select the designated mode as the mode having the lowest coding requirement, where this could mean the mode associated with, inter alia, lowest coding rate or the smallest number of coding rates or the lowest average coding rate, or any combination of the foregoing. Each of these possibilities is clearly within the scope of the present invention.

It should be appreciated that although the present invention has been described in the context of CDMA communication, it is applicable to other forms of communication such as UMTS. Specifically, the present invention does not impose a limitation on the modulation or transmission scheme employed to convey data between the mobiles 14, 24.

Those skilled in the art will appreciate that the control entity 36 may be implemented as an arithmetic and logic unit (ALU) having access to a code memory (not shown) which stored program instructions for the operation of the ALU. The program instructions could be stored on a medium which is fixed, tangible and readable directly by the control entity 36, (e.g., removable diskette, CD-ROM, ROM, or fixed disk), or the program instructions could be stored remotely but transmittable to the control entity 36 via a modem or other interface device (e.g., a communications adapter) connected to a network over a transmission medium. The transmission medium may be either a tangible medium (e.g., optical or analog communications lines) or a medium implemented using wireless techniques (e.g., microwave, infrared or other transmission schemes).

Those skilled in the art should also appreciate that the program instructions stored in the code memory can be compiled from a high level program written in a number of programming languages for use with many computer architectures or operating systems. For example, the high level program may be written in assembly language, while other versions may be written in a procedural programming language (e.g., "C") or an object oriented programming language (e.g., "C++" or "JAVA").

Those skilled in the art should further appreciate that in some embodiments of the invention, the functionality of the control entity 36 may be implemented as pre-programmed hardware or firmware elements (e.g., application specific integrated circuits (ASICs), electrically erasable programmable read-only memories (EEPROMs), etc.), or other related components.

Although various embodiments have been illustrated, this was for the purpose of describing, but not limiting, the invention. Various modifications will become apparent to those skilled in the art and are within the scope of the invention, which is defined more particularly by the attached claims.

I claim:

1. A communication apparatus, comprising:
   a) a first interface for establishing a first communication link with a first remote entity, the first remote entity including a coding unit capable of operating in at least one mode selected from a set of modes, wherein each mode in the set of modes is associated with a respective coding requirement;
   b) a second interface for establishing a second communication link with a second remote entity;
   c) a control entity suitable to establish a tandem-free transfer of data exchanged between the first remote entity and the second remote entity via said first and second interfaces;
   d) said control entity being operative to send control information to the first remote entity via said first interface to cause the coding unit to operate in a designated mode in the set of modes prior to establishment of the tandem-free transfer of data;
   e) the set of modes being characterized in that it has at least one mode that is associated with a greater coding requirement than the designated mode.

2. The apparatus defined in claim 1, said apparatus further comprising a coding unit in communication with said first and second interfaces, said coding unit in said apparatus being capable of operating in at least one mode selected from the set of modes.

3. The apparatus defined in claim 2, wherein said control entity is operative to cause said coding unit in said apparatus to operate in the designated mode prior to establishment of the tandem-free transfer of data.

4. The apparatus defined in claim 3, wherein said coding unit in said apparatus is a decoder, wherein the tandem-free transfer of data includes a transfer of data received from the first remote entity at said first interface to the second remote entity via said second interface, wherein during the tandem-free transfer of data the data received at said first interface is not decoded by said decoder prior to transmission to the second remote entity via said second interface.

5. The apparatus defined in claim 3, wherein said coding unit in said apparatus is a decoder, wherein the tandem-free transfer of data includes a transfer of data received from the first remote entity at said first interface to the second remote entity via said second interface, wherein during the tandem-free transfer of data the data received at said first interface is decoded by said decoder and is transmitted together with non-decoded received data to the second remote entity via said second interface.

6. The apparatus defined in claim 5, wherein the first communication link is a CDMA communication link and wherein the communication apparatus is a CDMA communication apparatus.

7. The apparatus defined in claim 6, wherein the control entity is suitable to establish a second tandem-free transfer of data received at said second interface from the second remote entity to the first remote entity via said first interface.

8. The apparatus defined in claim 7, wherein the coding unit in the first remote entity is an encoder, wherein the first remote entity further includes a decoder capable of operating in at least one mode selected from the set of modes, said control entity being operative to send control information to the first remote entity via said first interface to cause the decoder in the first remote entity to operate in the designated mode prior to establishment of the second tandem-free transfer of data.

9. The apparatus defined in claim 8, wherein said coding unit in said apparatus further comprises an encoder in communication with said first and second interfaces, said encoder in said communication apparatus being capable of operating in at least one mode selected from the set of modes.

10. The apparatus defined in claim 9, wherein said control entity is operative to cause said encoder in said apparatus to operate in the designated mode prior to establishment of the second tandem-free transfer of data.

11. The apparatus defined in claim 10, wherein said control entity is responsive to mode capability information received from the second remote entity after establishment of the first and second tandem-free transfers of data, to send control information to the first remote entity via said first interface to cause the coding unit in the first remote entity to operate in a mode other than the designated mode, wherein the mode other than the designated mode supports a greater coding requirement than the designated mode.

12. The apparatus defined in claim 11, wherein said apparatus maintains a set of modes in which said apparatus will allow the coding unit in the first remote entity to operate, said control entity being operative to send the control information to the first remote entity via said first interface to cause the encoder in the first remote entity to operate in the mode other than the designated mode only if the mode other than the designated mode belongs to the set of modes in which said apparatus will allow the coding unit in the first remote entity to operate.

13. The apparatus defined in claim 12, wherein said control entity is operative to send to the second remote entity via said second interface mode capability information indicative of the set of modes in which said apparatus will allow the coding unit in the first remote entity to operate.

14. The apparatus defined in claim 1, wherein said control entity is responsive to mode capability information received from the second remote entity after establishment of the tandem-free transfer of data, to send control information to the first remote entity via said first interface to cause the coding unit in the first remote entity to operate in a mode other than the designated mode, wherein the mode other than the designated mode supports a greater coding requirement than the designated mode.

15. The apparatus defined in claim 14, wherein said apparatus maintains a set of modes in which said apparatus will allow the coding unit in the first remote entity to operate, said control entity being operative to send the control information to the first remote entity via said first interface to cause the coding unit in the first remote entity to operate in the mode other than the designated mode only if the mode other than the designated mode belongs to the set of modes in which said apparatus will allow the coding unit in the first remote entity to operate.

16. The apparatus defined in claim 15, wherein said control entity is operative to send to the second remote entity via said second interface mode capability information indicative of the set of modes in which said apparatus will allow the coding unit in the first remote entity to operate.

17. The apparatus defined in claim 1, wherein each mode in the set of modes is associated with a number of coding rates and wherein the coding requirement associated with each mode in the set of modes is proportional to the number of coding rates associated with said mode.

18. The apparatus defined in claim 1, wherein each mode in the set of modes is associated with a plurality of coding rates and wherein the coding requirement associated with each mode in the set of modes is proportional to the maximum coding rate associated with said mode.

19. The apparatus defined in claim 1, wherein each mode in the set of modes is associated with a plurality of coding rates and wherein the coding requirement associated with each mode in the set of modes is proportional to a combination of the number of coding rates associated with said mode and the maximum coding rate associated with said mode.

20. The apparatus defined in claim 19, wherein the encoders and decoders are Selectable Mode Vocoder (SMV) codecs.

21. A communication method, comprising:
establishing a first communication link with a first remote entity, the first remote entity including a coding unit capable of operating in at least one mode selected from a set of modes, wherein each mode in the set of modes is associated with a respective coding requirement;
establishing a second communication link with a second remote entity;
sending control information to the first remote entity via the first interface to cause the coding unit to operate in a designated mode in the set of modes;
establishing a tandem-free transfer of data exchanged between the first and second remote entities via the first and second interfaces;
the set of modes being characterized in that it contains at least one mode that is associated with a greater coding requirement than the designated mode.

22. The method defined in claim 21, wherein the steps of sending control information to the first remote entity and establishing a tandem-free transfer of data are performed in the recited order.

23. The method defined in claim 22, further comprising:
receiving mode capability information from the second remote entity after establishment of the tandem-free transfer of data; and
sending control information to the first remote entity via the first interface to cause the coding unit in the first remote entity to operate in a mode other than the designated mode;
wherein the mode other than the designated mode is associated with a greater coding requirement than the designated mode.

24. The method defined in claim 23, further comprising:
maintaining a set of modes in which said apparatus will allow the coding unit in the first remote entity to operate
wherein sending the control information to the first remote entity via said first interface to cause the encoder in the first remote entity to operate in the mode other than the designated mode is performed only if the mode other than the designated mode belongs to the set of modes in which said apparatus will allow the coding unit in the first remote entity to operate.

25. The method defined in claim 24, further comprising:
send to the second remote entity via said second interface mode capability information indicative of the set of modes in which said apparatus will allow the coding unit in the first remote entity to operate.

26. A computer-readable storage medium containing instructions for execution in a computer of a method according to claim 21.

27. A computer-readable storage medium containing a program element for execution by a computer to implement a communication control entity comprising:
a first interface for establishing a first communication link with a first remote entity, the first remote entity including a coding unit capable of operating in at least one mode selected from a set of modes, wherein each mode in the set of modes is associated with a respective coding requirement;
a second interface for establishing a second communication link with a second remote entity;
a control entity suitable to establish a tandem-free transfer of data exchanged between the first and second remote entities via said first and second interfaces, said control entity being operative to send control information to the first remote entity via said first interface to cause the coding unit to operate in a designated mode in the set of modes prior to establishment of the tandem-free transfer of data;
the set of modes being characterized in that it has at least one mode that is associated with a greater coding requirement than the designated mode.

28. A signal embodied in a transmission medium, said signal originating from a communication apparatus and destined for a first remote entity having a coding unit capable of operating in at least one mode selected from a set of modes, wherein each mode in the set of modes is associated with a respective coding requirement, said signal comprising information capable of causing the coding unit to operate in a designated mode in the set of modes prior to establishment of a tandem-free transfer of data between the first remote entity and a second remote entity, wherein the set of modes is characterized in that it has at least one mode that supports a greater coding requirement than the designated mode.

* * * * *

UNITED STATES PATENT AND TRADEMARK OFFICE
CERTIFICATE OF CORRECTION

| | | |
|---|---|---|
| PATENT NO. | : 7,313,115 B2 | Page 1 of 1 |
| APPLICATION NO. | : 10/403109 | |
| DATED | : December 25, 2007 | |
| INVENTOR(S) | : Chung Cheung C. Chu | |

It is certified that error appears in the above-identified patent and that said Letters Patent is hereby corrected as shown below:

On the title page insert item (30), Foreign Application Priority Data:

--• No priority should have been claimed from German Patent Application Serial No. 102 18 037 filed on April 23, 2002. Instead, the foreign priority information should mention International PCT Patent Application Serial No. PCT/CA2003/000460 filed on March 31, 2003.--

Signed and Sealed this

Fifteenth Day of September, 2009

David J. Kappos
*Director of the United States Patent and Trademark Office*